United States Patent [19]
Oshima

[11] 3,906,524
[45] Sept. 16, 1975

[54] FLASHCUBE MOUNT
[75] Inventor: Shigeru Oshima, Tokyo, Japan
[73] Assignee: Fuji Photo Film Co., Ltd., Minami-ashigara, Japan
[22] Filed: June 28, 1974
[21] Appl. No.: 484,189

[30] Foreign Application Priority Data
July 24, 1973 Japan.............................. 48-83801

[52] U.S. Cl. ............................................ 354/142
[51] Int. Cl.² ........................................ G03B 15/04
[58] Field of Search........................... 354/142, 141

[56] References Cited
UNITED STATES PATENTS
3,810,215  5/1974  Armstrong.................. 354/142 UX Primary Examiner—Samuel S. Matthews
Assistant Examiner—Kenneth C. Hutchison
Attorney, Agent, or Firm—Sughrue, Rothwell, Mion, Zinn & Macpeak

[57] ABSTRACT

A flashcube mount mountable on a miniature camera, and providing support for a percussively operable flashcube, comprising a push-button, which connects through a spring means to a percussion plate carrying a firing pin, and to a multi-arm lever connected to a camera shutter cocking and releasing mechanism, and to the percussion plate. Upon depression of the push-button, the percussion plate causes the multi-arm lever to swivel rapidly to fire the flashcube by the firing pin thereof, and the multi-arm lever causes the camera mechanism to release the shutter.

9 Claims, 6 Drawing Figures

3,906,524

FLASHCUBE MOUNT

FIELD OF INVENTION

The present invention relates to a flashcube mount, and more particularly to a flashcube mount which is suited for use in association with a miniature camera, and makes it possible to effect actuation of a camera shutter together with firing of a flashcube.

PRIOR ART

A problem associated with taking flash photographs with a miniature camera is that, because of the small size of the camera, if a source of artificial light, such as a flashcube, is mounted directly on the camera, the flashcube is inevitably very close to the camera lens, and when the flashcube is fired, there is a possibility of light therefrom impinging directly onto the camera lens, thereby resulting in blur, halos, or other undesired effects. It is known conventionally to overcome this problem by the provision of a flashcube mount, which supports a flashcube and is itself mounted on a miniature camera, whereby the flashcube is held at a certain distance from the camera lens, and direct impingement of flash tight on the lens is avoided. The mount is also connected with the camera such that depression of a shutter button, i.e., shutter actuation, also effects firing of the flashcube, the means for firing the flashcube conventionally being a firing pin, which is provided at a lower portion of the flashcube, and is moved rapidly thereinto upon actuation of the shutter of the associated camera.

A principal disadvantage of conventional flashcube mounts is that, since a firing pin is linked to and actuated together with a shutter, there is necessarily some delay between start of emission of light by the flashcube and opening of the shutter, with the result that there is poor synchronization between peak emission of light and shutter opening, and there is a tendency to produce underexposed photographs.

SUMMARY OF THE INVENTION

It is accordingly an object of the present invention to provide a flashcube mounted whereby a camera shutter is opened immediately subsequent to the action of firing a flashcube, these actions being effected by the depression of a push-button.

In accomplishing this and other objects, there is provided, according to the present invention, a flashcube mount mountable on a miniature camera, which provides support for a flashcube and comprises a push-button, which connects through a spring means to a percussion plate carrying a firing pin, and to a multi-arm lever connected to a camera shutter cocking and release mechanism, and to the percussion plate. Upon initial depression of the pushbutton, the multi-arm lever is swivelled into a position in which one arm thereof actuates the camera mechanism to cock the shutter, while another arm thereof, although moved, remains in contact with, and prevents movement of the percussion plate. At the same time, the push-button presses the spring means, which is in fixed attachment to the percussion plate, whereby, since the percussion plate is blocked, the spring means is forced out of its normal alignment relative to the percussion plate and becomes tensed. When the push-button is depressed further, the multi-arm lever is moved thereby into a position in which it no longer blocks, but remains in contact with, the percussion plate. The percussion plate is then swivelled rapidly into its normal alignment with the spring means, by which action the firing pin attached to the percussion plate enters and fires the flashcube, the percussion plate causes the multi-arm lever to swivel rapidly, and the multi-arm lever causes the camera mechanism to release the shutter. The flashcube mount of the invention is not only employable in association with a miniature camera wherein cocking of a shutter is effected by advance of a film, and also with a miniature camera wherein cocking of a shutter is not interconnected with advance of a film. In this latter case, it is necessary for the multi-arm lever to act on a camera mechanism to effect shutter release only.

DESCRIPTION OF THE DRAWINGS

A better understanding of the present invention may be had from the following full description, when read in conjunction with the attached drawings, in which.

DETAILED DESCRIPTION OF THE INVENTION

Before the description of the present invention proceeds, it is to be noted that like parts are designated by like reference numbers throughout the several views of the accompanying drawings.

Figure 1:
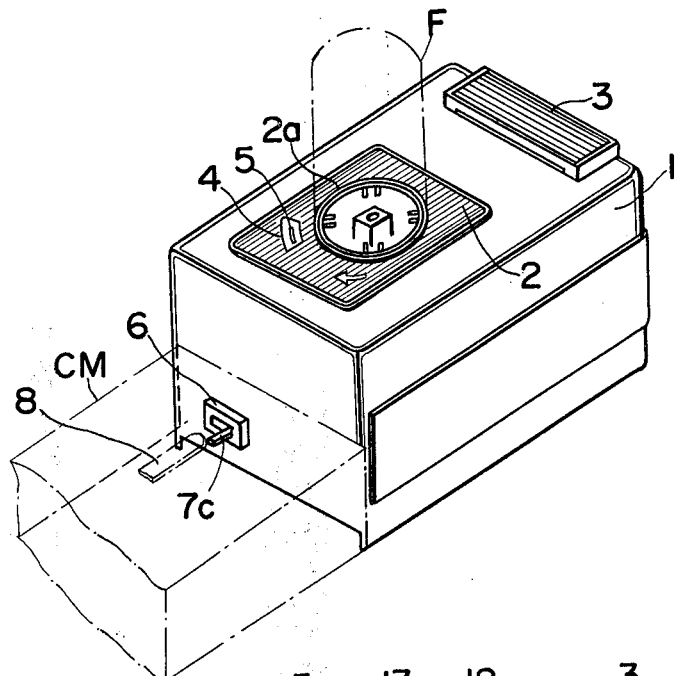
FIG. 1 is a perspective view of a flashcube mount according to the present invention.

Referring initially to FIG. 1, there is shown a flashcube mount 1, which has the general external form of a small box, and on the outer surface of whose upper side thereof is provided a seat plate 2. In a generally central portion of the seat plate 2 there is formed a socket 2a, which permits a flashcube F, shown with a chain-dot line, to be securely mounted on the mount 1. In an off-centre portion of the seat plate 2 there is formed a small opening 4, through which a firing pin 5 may pass, upwards in the drawing, to fire the flashcube F. The firing pin 5, whose actuation is described in further detail below, may fire the flashcube F directly, or may act as a trigger to a pin provided in the flashcube F. The flashcube mount 1 is itself mounted, in a suitable known manner such as fitting with each other, onto a miniature camera CM, which is indicated in a schematic manner only, by the chain-dot line portion of FIG. 1. In the mount 1 side wall which contacts the camera CM there is formed a window 6. A lever arm 7c of a lever 7, described below, projects through and is movable forwards or rearwards in the window 6 and is able to contact and actuate a shutter cocking and trip actuation lever 8, which is a conventionally known means provided in a miniature camera CM. Only an end portion of the activation lever is shown in FIG. 1. The firing pin 5 and lever 7 are actuated by a pushbutton 3, which is in the form of a horizontally aligned, generally rectangular block provided at the upper side of the flashcube mount 1, near the edge farthest removed from the camera CM.

Figure 2:
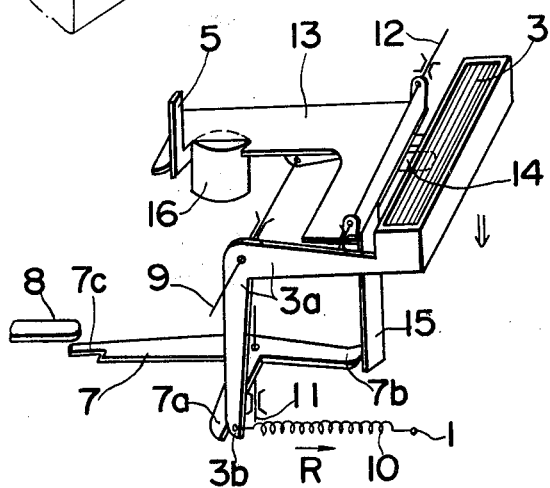
FIG. 2 is a perspective view, on an enlarged scale, of selected parts of the interior of the flashcube mount of FIG. 1.

In reference now to FIG. 2, the push-button 3 controls the action of an integrally attached lever 3a. The lever 3a comprises a first arm which is normally horizontal, and extends at right-angles from the push-button 3, in the direction towards the camera CM, and a second arm which extends downwards at right-angles from the end of the first arm. The lever 3a is pivotally mounted on a fixed shaft 9, which passes through the junction of the two arms thereof, whereby, when the push-button 3 is depressed manually, the lever 3a is rotated clockwise as viewed in the drawings. A compression spring 10, which is fixedly attached at one end to the lower end 3b of the second arm of the lever 3a, and at the other end to a fixed portion of the flashcube mount 1, exerts a constant force tending to turn the lever 3a counterclockwise, whereby the push-button 3 is returned to or normally held in an uppermost position. The edge of the bottom end 3b of the second arm of the lever 3a contacts the end of a first lever arm 7a of the lever 7.

Still in FIG. 2, the lever 7 is aligned horizontally, is pivotally mounted on a fixed vertical shaft 11, and comprises first, second, and third lever arms 7a, 7b and 7c respectively, the lever arms 7b and 7c being in a straight line and extending in opposite directions from the pivotal axis of the lever 7. The first lever arm 7a extends at right-angles to the lever arms 7b and 7c. As noted earlier, the lever arm 7c extends through the window 6 of the flashcube mount 1 as shown in FIG. 1, and may contact the actuation lever 8 of a shutter cocking and release mechanism. The lever arm 7a contact the end 3b of the second arm of the lever 3a. The end of lever arm 7b contacts the lower end of a detent plate 15, described below.

Figure 3:
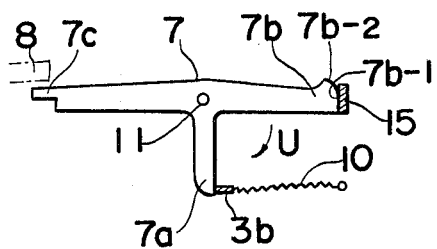
FIGS. 3 through 5 are plane drawings illustrating the sequence of action of lever means, detent plate, and shutter actuation lever of FIG. 2.
Figure 4:
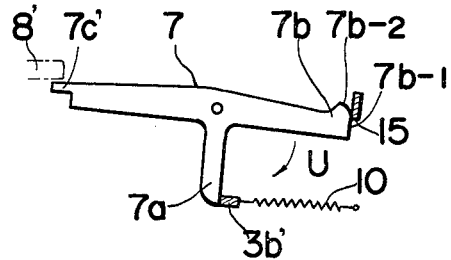
Figure 5:
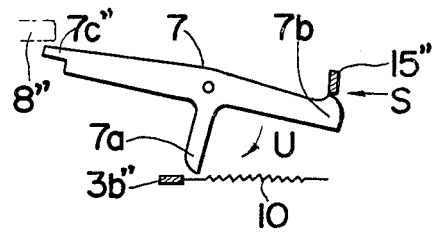

As shown most clearly in FIG. 3, this end lever arm 7b comprises a straight portion 7b–1, and a curved portion 7b–2, which curves away from the detent plate 15. When the lever 7 is in its normal, unactuated position, the straight end portion 7b–1 contacts and prevents leftwards movement of the detent plate 15. Also, in the normal position of the lever 7, lever arm 7c does not contact the actuation lever 8 of the camera CM, as shown in FIG. 3, while the second lever arm 7b always contacts the bottom end 3b of the second arm of the lever 3a. The length of the straight end portion 7b-1 of the second lever arm 7b is such that even when the lever 7 is rotated a certain amount in the direction indicated by the arrow U in the drawing, the end portion 7b–1 still remains in contact with the detent plate 15 and prevents leftward movement thereof as shown in FIG. 4. When, however, the lever 7 is rotated more than a certain amount in the direction U, the curved end portion 7b–2 comes opposite the detent plate 15, whereby leftward movement of the plate 15 is permitted as shown in FIG. 5.

Referring back to FIG. 2, the detent plate 15 is integrally attached to and extends vertically downwards from one edge of a horizontally aligned percussion plate 13. The percussion plate 13 is pivotal about a fixed shaft 12, which passes through lugs attached to the plate 13, near the one edge thereof. The abovementioned firing pin 5, which is in line with the opening 4 in the seat plate 2 as shown in FIG. 1, is fixedly attached to, and projects upwards from the opposite edge of the percussion plate 13. Below the opposite end of the plate 13 there is provided a stopper 16, which prevents the plate 13 from moving more than a certain amount in a counter clockwise direction. One end of a spring plate constituting a trigger plate 14 is fixedly attached to a generally central portion of the lower surface of the percussion plate 13. The trigger plate 14 extends from the one edge of the percussion plate, and the free end thereof lies under and is contacted by the pushbutton 3.

In order to take a flash photograph, the pushbutton 3 is depressed, which results in the action described below in reference to FIGS. 2 through 5.

As the start of depression of the push-button 3, the lever 3a is pivoted about the shaft 9, counter to the force of the spring 10, and the lever arm end 3b pushes the lever arm 7a of the lever 7, and causes the lever 7 to turn clockwise as seen from above. At the same time the push-button 3 presses directly on the trigger plate 14, and pushes the trigger plate 14 downwards. At this stage, the straight end portion 7b–1 of the lever arm 7b still contacts the lower end of the detent plate 15, which is therefore prevented from moving. The detent plate 15 being prevented from moving, the percussion plate 13, which is integrally attached thereto, is also prevented from moving. The trigger plate 14, being fixedly attached at one end to the stationary percussion plate 13, is flexed and tensed by the downward pressure imparted thereon by the push-button 3. Also at this stage, the shutter actuation lever 8 is contacted and moved slightly by the end of lever arm 7c, and starts to move the camera shutter to a cocked position, in a conventionally known manner.

In FIG. 4, as the push-button 3 continues to be depressed, and the lever 7 to be rotated in the direction U by pushing of the end 3b of the second arm of the lever 3a, the lever arm 7c is moved to the position 7c' and pushes the shutter actuation lever 8 to the position 8', at which the camera shutter is moved to a fully cocked position. At the same time, the lever arm 7b is swung into a position in which the junction of the straight end portion 7b–1 and the curved end portion 7b–2 thereof is brought into contact with the edge of the detent plate 15. At this stage, the push-button 3 having been moved still further downwards, while the percussion plate 13 is prevented from moving due to contact of the lever 7 with the detent plate 15, tension and potential energy of the trigger plate 14 are still further increased.

In FIGS. 1 and 5, when the push-button 3 is depressed further very slightly, the lever arm 7a is moved out of the contact with the end 3b of the second arm of the lever 3a, and, then, the straight end portion 7b–1 of the lever arm 7b is moved out of contact with the detent plate 15. The detent plate 15 is no longer blocked, and the detent plate 15 and percussion plate 13 assembly is free to pivot about the shaft 12. At the same time however, the outer end of the trigger plate 14 is still pressed down by the push-button 3. The tension force in the trigger plate 14 therefore causes the percussion plate 13 to swing sharply clockwise, resulting in two actions. One action is that the firing pin 5 is moved rapidly upwards through the opening 4 as shown in FIG. 1, and fires the mounted flashcube F. The other action is that the detent plate 15, which is moved together with the percussion plate 13, moves to the position 15″, shown in FIG. 5, and at the same time, rides on and pushes the curved end portion 7b–2 of the lever arm 7b, whereby the lever 7 is rotated in the direction U much more rapidly than was effected by pressure of the push-button 3. The lever arm 7c moves to the position 7c'', and pushes the shutter actuation lever 8 to the position 8'', at which the camera shutter is released to expose a film. When manual pressure on the push-button 3 is released, the spring 10 moves the lever 3a and push-button 3 back to their original configuration, the spring plate 14 moves the precussion plate 13 and detent plate 15 back to their original configuration, and the detent plate 15 moves the lever 7 back to its original configuration.

Figure 6:
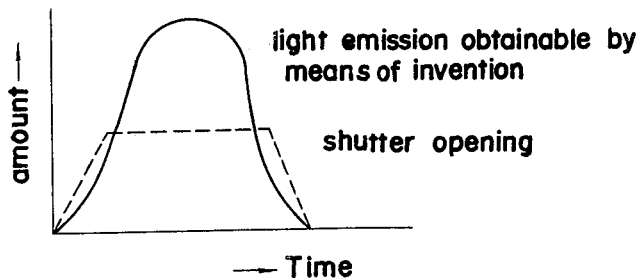
FIG. 6 is a diagram showing the relation between shutter opening and the emission of light obtainable with the flashcube mount of FIG. 1.

As is clear from the above description, the present invention provides a flashcube mount for a miniature camera permitting accurate timing of shutter opening in relation to flashcube firing. FIG. 6 shows the accurate synchronization of shutter opening with peak light emission that is obtainable with the means of the invention. If required, of course, the flashcube mount of the invention is easily adjustable for use in association with a camera in which a shutter is cocked when a film is advanced, in which case it is simply necessary to adjust the relationship between the lever arm 7c and shutter actuation lever 8 to cause the lever 8 to effect shutter release only.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A flashcube mount on the outer surface of which is provided a socket engageable with a percussively fireable flashcube comprising: (a) an outer housing having means for attachment to a camera, (b) a firing pin movable to fire a flashcube attached to said housing, (c) a push-button, for actuating said firing pin and operating a camera shutter synchronously, operatably provided on said mount, (d) a first lever pivotally attached to said housing and rotatable by said push-button, (e) a pivotal percussion plate pivotally attached to said housing which carries said firing pin, (f) a detent plate fixedly attached at one end to said percussion plate, (g) a spring plate, one end of which is fixedly attached to said percussion plate, and another end of which engages said push-button, (h) a second lever means pivotally attached to said housing which is rotatable by said first lever means upon depression of said push-button, said second lever actuating a camera shutter actuation means of a camera usable with said mount when mounted on such a camera upon being rotated a certain amount, and (i) a cam surface on said second lever means engaging said detent plate to prevent movement of said detent plate until said second lever means is rotated a predetermined amount.

2. The flashcube mount of claim 1 wherein said first lever means comprises first and second lever arms, said first arm having a first end engaging said push button, said second arm having a first end engaging said second lever means, said lever arms being joined at their second ends and pivotally attached to said housing at the juncture of the two lever arms.

3. The flashcube mount of claim 2 wherein said two lever arms are disposed at approximately 90° to each other.

4. The flashcube mount of claim 2 wherein said first lever arm is integral with said pushbutton at its first end.

5. The flashcube mount of claim 1 wherein said second lever means comprises first, second and third lever arms extending in a generally radial direction from the lever means pivotal attachment.

6. The flashcube mount of claim 5 wherein said second and third lever arms are each disposed 90° from said first lever arm.

7. The flashcube mount of claim 5 wherein said first lever arm engages said first lever means, said second lever arm engages said detent plate and said third lever arm engages a common shutter cocking and releasing mechanism when said flashcube mount is attached to a camera usable with said mount.

8. The flashcube mount of claim 7 wherein said cam surface is located on the distal end of said second lever arm.

9. The flashcube mount of claim 1 wherein the pivotal axis of said first lever means is disposed 90° with respect to the pivotal axis of said second lever means.

* * * * *